US008516993B2

(12) United States Patent
Hillion et al.

(10) Patent No.: US 8,516,993 B2
(45) Date of Patent: Aug. 27, 2013

(54) METHOD OF CONTROLLING THE COMBUSTION OF A SPARK-IGNITION ENGINE USING COMBUSTION TIMING CONTROL

(75) Inventors: Mathieu Hillion, Paris (FR); Jonathan Chauvin, Neuilly-sur-Seine (FR)

(73) Assignee: IFP, Rueil-Malmaison (FR)

( * ) Notice: Subject to any disclaimer, the term of this patent is extended or adjusted under 35 U.S.C. 154(b) by 975 days.

(21) Appl. No.: 12/605,509

(22) Filed: Oct. 26, 2009

(65) Prior Publication Data

US 2010/0108033 A1 May 6, 2010

(30) Foreign Application Priority Data

Oct. 31, 2008 (FR) ..................................... 08 06058

(51) Int. Cl.
*F02P 5/00* (2006.01)
*G06F 19/00* (2011.01)
*G06G 7/70* (2006.01)

(52) U.S. Cl.
USPC ............ 123/406.23; 123/406.17; 123/406.19; 123/406.41

(58) Field of Classification Search
USPC ............. 123/406.21, 406.22, 406.23, 406.27, 123/406.33, 406.37, 406.41, 435, 406.17, 123/406.19; 701/101, 102, 111
See application file for complete search history.

(56) References Cited

U.S. PATENT DOCUMENTS 6,786,200 B2 * 9/2004 Viele et al. ............... 123/406.27
7,347,185 B2 3/2008 Moriya et al.
2004/0194758 A1 10/2004 Hochstrasser et al.
2005/0039721 A1 * 2/2005 Truscott et al. .......... 123/406.22
2005/0115542 A1 * 6/2005 Hochstrasser et al. ... 123/406.23
2007/0079817 A1 * 4/2007 VanDyne et al. ........ 123/568.21
2007/0113821 A1 * 5/2007 Kang et al. .................... 123/299
2008/0202469 A1 * 8/2008 Kang et al. .................... 123/435
2009/0099754 A1 * 4/2009 Reuss et al. .................. 701/103

FOREIGN PATENT DOCUMENTS

EP 1 650 422 4/2006
WO WO 02/095191 11/2002

OTHER PUBLICATIONS

Institute National de la Propriété, Rapport de Recherche Préliminaire (Preliminary Search Report).

* cited by examiner

*Primary Examiner* — Stephen K Cronin
*Assistant Examiner* — Raza Najmuddin
(74) *Attorney, Agent, or Firm* — Antonelli, Terry, Stout & Kraus, LLP.

(57) ABSTRACT

A method of controlling the combustion of a spark-ignition engine having application to gasoline engines is disclosed. An engine control system controls actuators so that the values of physical parameters linked with the combustion of a mixture of gas and fuel in a combustion chamber are equal to their setpoint values, to optimize the combustion. A setpoint value is determined for an ignition crank angle of the fuel mixture which is then corrected before the physical parameters reach their setpoint values. A correction to be applied to this ignition angle setpoint value is calculated so that the crank angle $CA_y$ is equal to its setpoint value. Finally, the engine control system controls the ignition of the mixture in the combustion chamber when the crank angle is equal to the corrected setpoint value to optimize combustion.

32 Claims, 3 Drawing Sheets

METHOD OF CONTROLLING THE COMBUSTION OF A SPARK-IGNITION ENGINE USING COMBUSTION TIMING CONTROL

BACKGROUND OF THE INVENTION

1. Field of the Invention

The present invention relates to the field of engine control and more particularly to the combustion control of spark-ignition engines.

2. Description of the Prior Art

Operation of a (gasoline type) spark-ignition engine is based on the combustion of a mixture of air, burnt gas and fuel. The engine cycle can be broken down into four phases (FIG. 1):

The intake phase (ADM): the intake valve allows the mixture of air and of burnt gas into chamber CHB. The air is taken from the outside environment of the engine. The burnt gas is taken from exhaust manifold ECH and sent back to the intake manifold (exhaust gas recirculation EGR) and/or sucked back by the exhaust valve (internal exhaust gas recirculation iEGR). The fuel is injected during the intake phase. The Variable Valve Timing (VVT) device allows a time lag to be applied to the intake (VVTa) and exhaust (VVTe) valve lift profiles. This has a direct impact on the gas composition and on the turbulence in the combustion chamber;

The compression phase: after the intake valve closes (IVC: Intake Valve Closing), piston PIS compresses the gas;

The combustion phase: spark plug BOUG produces a spark that initiates the combustion of the mixture of air, burnt gas and fuel which ignites while releasing the chemical energy available in the fuel, thus creating an overpressure that pushes the piston backwards;

The expansion phase: once the piston has gone back down again, the exhaust valve opens and the gas mixture is then discharged through the exhaust manifold.

The goal of engine control is to supply the driver with the torque required while minimizing the noise and pollutant emissions. Control of the amounts of the different gases and of the fuel therefore has to be adjusted as finely as possible.

To carry out combustion control of a spark-ignition engine, there are known methods allowing determination of the combustion medium by means of detectors mounted in the engine. There are methods based on direct measurements in the combustion chamber, such as those provided by:

Cylinder Pressure Detectors: Paljoo Yvon et al., "*Closed-loop Control of Spark Advance and Air-fuel Ratio in SI Engines Using Cylinder Pressure*", Society of Automotive Engineering World Congress, 2000-01-0933, Ionization Current Detectors in the Combustion Chamber: Lars Eriksen et al., "*Closed loop Ignition Control by Ionization Current Interpretation*", SAE 1997 Transactions, Journal of Engines, Vol. 106, Section 3, pp. 1216-1223, 1997.

However, using such detectors in standard vehicles is difficult due to their considerable cost. Furthermore, these detectors are generally subject to relatively fast drifts.

There are also methods wherein the amounts and timing are optimized on each static working point (speed and torque) so as to bring out an ideal strategy at each point. An engine test bench calibration is therefore performed in order to obtain the optimum values for the main three data sets:

Air Loop:

the mass of air $M_{air}$ and of burnt gas $M_{gb}$ required in the combustion chamber;

the pressure and the temperature of these gases in the combustion chamber; and the position of the variable valve lift devices (VVT) and notably the intake valve closure angle denoted by $\theta_{ivc}$.

These thermodynamic and physical variables $X_{air}=(M_{air}, M_{bg}, P, T, \theta_{IVC})$ are represented by $X_{air}$.

Fuel Loop:

The mass of fuel $M_f$ injected into the combustion chamber (injection directly into the chamber or indirectly into the intake pipe), $X_{fuel}=(M_f)$.

Ignition Loop:

The crank angle $\theta_{all}$ at which the spark appears (via the plug), denoted by $X_{all}=(\theta_{all})$.

However, these strategies are insufficient in transient phases. In fact, during transition phases from one working point to another (change in the vehicle speed or in the road profile), the engine control supervises the various actuators present in the engine to guarantee the desired torque while minimizing the noise, the pollutant emissions and the consumption. This is thus translated into the change from the values of the parameters of the initial point to the values of the parameters of the final point:

$$\begin{cases} X_{air}^{initial} \to X_{air}^{final} & \text{(a)} \\ X_{fuel}^{initial} \to X_{fuel}^{final} & \text{(b)} \\ X_{all}^{initial} \to X_{all}^{final} & \text{(c)} \end{cases}$$

Now, there are two time scales in the engine. The faster one (50 Hz) corresponds to the entire combustion phenomenon (1 engine cycle). On this scale, the injection ($X_{fuel}$) and the ignition ($X_{all}$) strategy can be changed to control the combustion. The slower one (1 Hz) corresponds to the gas dynamics in the engine manifolds (intake, exhaust, burnt gas recirculation) and the inertia of the actuators (turbocompressor TC). The strategy of this air loop ($X_{air}$) cannot be changed faster.

With current methods, the controlled variables ($X_{air}$, $X_{fuel}$, $X_{all}$) do therefore not reach at the same time their setpoint values because of the difference in dynamics. The objectives regarding torque production, namely, consumption, pollutants, and noise are thus met in the static phases (the dynamic loops are stabilized at their reference values). On the other hand, if precautions are not taken in the transient phases, part of the parameters reach nearly instantaneously their final setpoint value whereas the other part is still at the initial setpoint value. This results in the engine then producing more pollutant emissions or noise and can even cause stopping in some cases.

Furthermore, without cylinder pressure detectors, the known methods do not allow controlling combustion timing during the transient phases. Now, as illustrated by FIGS. 2 and 3, this is not sufficient to ensure proper operation of the engine under transient conditions.

SUMMARY OF THE INVENTION

The invention relates to a method providing control of the combustion of a spark-ignition engine, notably under transient conditions, while overcoming prior art problems. The method achieves this, on the one hand, by controlling three dynamic loops separately and, on the other hand, by correcting the reference value of the ignition angle via control of angle $CA_{50}$.

The invention thus relates to a method of controlling the combustion of a spark-ignition engine, comprising: determining setpoint values for physical parameters linked with the combustion of a mixture of gas and of fuel in a combustion chamber and a setpoint value $(\theta_{all})_{ref}$ for an ignition crank angle for the mixture, the setpoint values being determined to optimize combustion, and an engine control system that controls actuators so that values of the physical parameters are equal to the setpoint values.

The method comprises the following stages:

correcting setpoint value $(\theta_{all})_{ref}$ before the physical parameters reach their setpoint values, by calculating a correction $d\theta_{all}$ to be applied to the setpoint value $(\theta_{all})_{ref}$ so that a crank angle $CA_y$ at which y percent of the fuel is consumed during combustion is equal to a setpoint value of the angle for an optimized combustion;

the engine control system controls the ignition of the mixture in the combustion chamber when the crank angle is equal to the corrected setpoint value $(\theta_{all})_{ref}$ in order to keep combustion optimal.

According to the invention, correction $d\theta_{all}$ can be determined by accounting for differences dp between real values p of the physical parameters and the setpoint values $p^{ref}$ of the physical parameters. It is therefore possible to use a combustion model defined by a differential equation allowing modelling an evolution over time of a consumed fuel mass, and by linearizing the combustion model to p around setpoint values $p^{ref}$, then by calculating a first-order solution for the correction to be made so that correction $d\theta_{all}$ is proportional to differences dp.

According to an embodiment, correction $d\theta_{all}$ can thus be determined by applying the following stages:

determining the real values of the physical parameters;

calculating the differences dp between the real values and the setpoint values;

determining the setpoint value $(CA_y)_{ref}$ of crank angle CAy by of a numerical integration of the combustion model by assigning to each parameter of the model the setpoint value;

calculating linearization matrix Λ of the combustion model by linearizing the combustion model to p around setpoint values $p^{ref}$; and calculating correction $d\theta_{all}$ by the formula:

$$d\theta_{all}=((CA_y)_{ref}-(\theta_{all})_{ref})\cdot\Lambda\cdot dp$$

According to a preferred embodiment, crank angle CAy is the crank angle at which fifty percent of the fuel is consumed during combustion.

According to the invention, the physical parameters can be selected from among at least the following parameters upon valve closing: pressure in the combustion chamber $(P_{IVC})$, temperature in the combustion chamber $(T_{IVC})$, ratio $(X_{IVC})$ between a burnt gas mass and a total gas mass in the combustion chamber, air mass $(M_{IVC})$ in the cylinder and closure angle $(\theta_{ivc})$ of an intake valve.

Finally, it is also possible to adapt a mass of fuel injected into the combustion chamber before the physical parameters reach their setpoint values by controlling the richness of the combustion.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
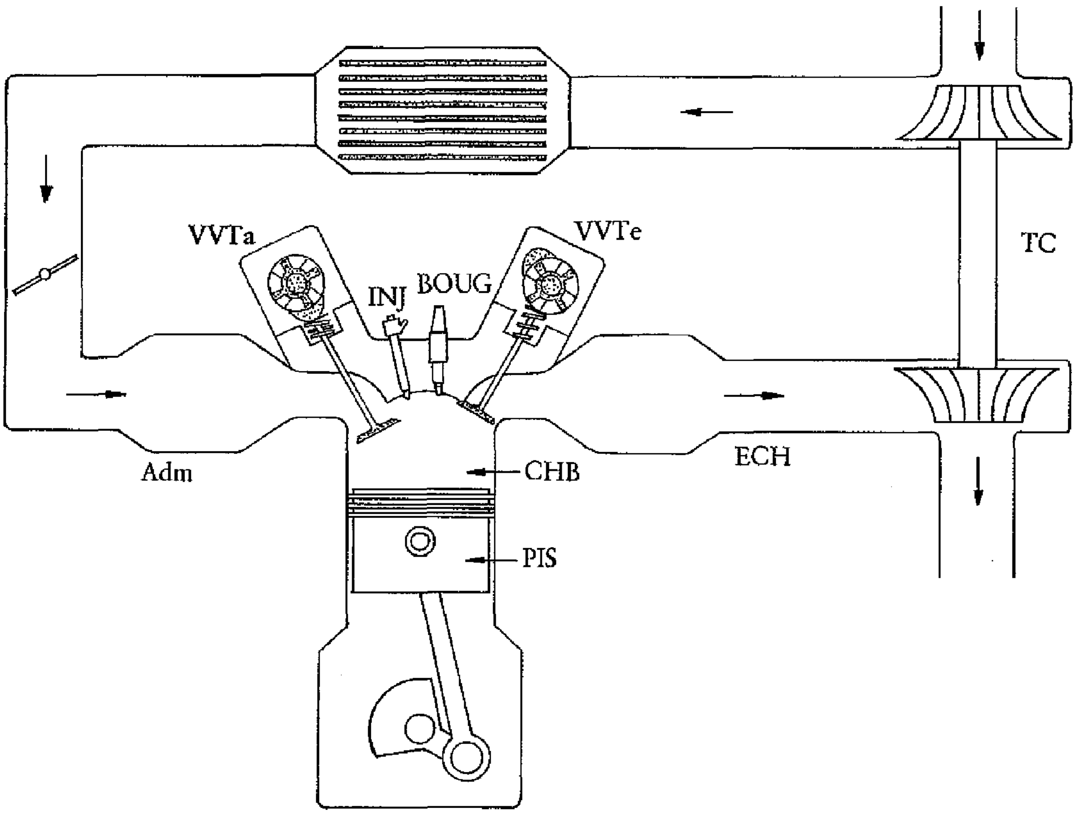
FIG. 1 shows the various phases of a combustion cycle of a spark-ignition engine.

The method according to the invention allows controlling the combustion progress of a spark-ignition engine, in a static phase as well as in a transient phase. It comprises separate and independent control of the air loop (slow loop) and of the fuel and ignition loops (fast loops), through adaptation of the fast loop dynamics to be coherent with the air loop. The method thus allows adaptation of $X_{fuel}$ and $X_{all}$ to keep the characteristics of the combustion required (through the driver's torque request). The impact on emissions and noise is thus limited while ensuring the required torque to the driver.

According to this method, control of the combustion of a spark-ignition engine is carried out in five stages:

1—Determining Setpoint Values for Various Physical Parameters

During transition phases from one working point to another (change in the vehicle speed or in the road profile), the engine control supervises the various actuators present in the engine to guarantee the desired torque while minimizing the noise, the pollutant emissions and the consumption. This is thus translated into the change from the values of parameters $X_{air}$, $X_{fuel}$ and $X_{all}$ of an initial point to the values of the parameters of a final point:

$$\begin{cases} X_{air}^{initial} \to X_{air}^{final} & \text{(a)} \\ X_{fuel}^{initial} \to X_{fuel}^{final} & \text{(b)} \\ X_{all}^{initial} \to X_{all}^{final} & \text{(c)} \end{cases}$$

The final values are defined to optimize combustion, that is, to burn a maximum amount of fuel in order to minimize emissions and consumption while minimizing the noise. These final values optimizing the combustion are referred to as setpoint values. The engine control enforces these setpoint values.

The important physical parameters regulated by the air loop are the pressure, the temperature, the chemical composition of the gases in the chamber and the intake valve closing angle. Ideally, these parameters reach their setpoint value instantaneously. In reality, the slowness of the air loop results in an error on these parameters $X_{air}$ between their setpoint value and their real value, throughout the transition phase. Consequently, the thermodynamic parameters (mass, pressure, temperature and burnt gas rate) of the gas feed sucked in the cylinder are different from their setpoint value. The fuel and ignition loop control is adapted to the errors on the following parameters:

P: The pressure in the combustion chamber. It depends on crank angle θ,

T: The temperature in the combustion chamber. It depends on crank angle θ,

X: The ratio between the burnt gas mass and the total gas mass in the combustion chamber (parameter between 0 and 1). It depends on crank angle θ, $M_{air}$: The mass of air trapped in the cylinder.

The value of these parameters is determined upon valve closing (IVC):

$P_{IVC}$: The pressure in the combustion chamber upon valve closing;

$T_{IVC}$: The temperature in the combustion chamber upon valve closing;

$X_{IVC}$: The ratio between the burnt gas mass and the total gas mass in the combustion chamber upon valve closing;

$M_{IVC}$: The mass of air in the cylinder upon valve closing;

$\theta_{IVC}$: The closing angle of the intake valve; it directly influences the turbulence in the combustion chamber.

The values of these five parameters are continuously determined. Therefore, it is assumed that composition ($X_{IVC}$) and pressure ($P_{IVC}$) in the cylinder upon valve closing are the same as those in the intake manifold where measurements are available (through detectors or estimators). $T_{IVC}$ is estimated by means of the ideal gas law $$T_{IVC} = \frac{P_{IVC}V_{IVC}}{RM_{IVC}}$$

where R is the ideal gas constant (R=287) and $M_{IVC}$ is the mass sucked by the cylinder that is measured by a flowmeter.

For these five physical parameters linked with the intake of gaseous oxidizer in the combustion chamber of the engine, the setpoint values are respectively denoted by: $P_{ref}$, $T_{ref}$, $X_{ref}$, $M_{ref}$ and $(\theta_{ivc})_{ref}$.

These setpoint values are obtained from a setpoint map established on an engine test bench. The setpoint values of these parameters are given by the optimum point mapped on the test bench (values that these parameters must reach). These setpoint values are determined to optimize the combustion. These parameters are related by the ideal gas relation (PV=MRT) but, for simplicity reasons, this relation is not directly made explicit. This does not affect the method provided in any way.

According to the invention, the parameter which is controlled is the mixture ignition angle: $\theta_{all}$. Its reference value (given by the optimum point mapped on the test bench) is denoted by $(\theta_{all})_{ref}$. The parameter to be kept constant is crank angle CAy, which is the angle at which y percent of the fuel is consumed during combustion. It is attempted to maintain this angle at a setpoint value $(CA_y)_{ref}$ of this angle for an optimum combustion. According to a preferred embodiment, the half combustion angle $CA_{50}$ is used. It is the crank angle at which 50% of the fuel has been consumed during the optimized combustion (combustion obtained with the setpoint values).

2—Air Loop Control (Slow Loop)

Once setpoint values $P_{ref}$, $T_{ref}$, $X_{ref}$, $M_{ref}$ and $(\theta_{ivc})_{ref}$ are determined, an engine control system controls actuators so that the values of the physical parameters $P_{IVC}$, $T_{IVC}$, $X_{IVC}$, $M_{IVC}$ and $\theta_{ivc}$ equal to their setpoint values $P_{ref}$, $T_{ref}$, $X_{ref}$, $M_{ref}$ and $(\theta_{ivc})_{ref}$.

3—Fuel Loop Adaptation (Fast Loop)

Adapting the control of the fuel mass injected into the air loop dynamics is conventionally achieved by controlling the combustion richness: in fact, removing from the exhaust gas from gasoline engines can be accomplished by a three-way catalyst. It allows efficient treatment of the CO, HC and NOx produced by the combustion, provided that the exhaust gas is globally neither oxidizing nor reducing. The combustion richness ($\lambda$) is defined as the excess air mass $M_{air}$ in relation to the fuel mass $M_f$ brought to the same ratio in the case of stoichiometric combustion (this stoichiometric ratio is denoted by PCO). Thus, $$\lambda = \frac{M_f}{M_{air}}\frac{1}{PCO}.$$

The removing of pollution is thus efficient when the richness is close to 1. The control strategy for the fuel mass that is injected is thus reduced to the estimation of the air mass sucked into the cylinder from the air loop parameters. Estimation of the air mass $M_{air}$ then allows applying the command $$M_f = \frac{1}{PCO}M_{air}.$$

4—Ignition Loop Adaptation a. Calculating the Correction of the Ignition Angle Setpoint Value $(\theta_{all})_{ref}$ The conventional control strategy for ignition angle $\theta_{all}$ is a prepositioning depending on the engine speed and on the estimation of the air mass sucked in the cylinder (via mapping). Unlike the fuel mass control, this strategy is not optimal. In fact, if the fuel mass injected provides a torque potential, it is the ignition timing that guarantees good exploitation of this potential.

If ignition occurs too early, combustion also takes place early, causing a pressure increase during the compression phase, which goes against torque production;

if ignition occurs too late, combustion also takes place late and it is the entire expansion phase that will occur at a lower pressure. The torque produced is then lower.

The $CA_{50}$ (crank angle at which 50% of the fuel is burned) is the crank angle that allows accounting for this combustion timing. It is conventionally admitted that each engine has a fixed reference crank angle $(CA_{50})_{ref}$ depending on the engine's technical data. The ignition strategy is then optimal if the $CA_{50}$ is regulated to its reference value $(CA_{50})_{ref}$.

It is therefore necessary to take into account all the thermodynamic and physical parameters that influence the combustion in order to best control the ignition angle. Conventional ignition angle prepositioning, depending on the engine speed and the air mass sucked, is thus the start of an adaptation of the ignition loop to the slow parameters of the air loop, but it is not complete. In fact, other parameters of the air loop influence the combustion:

the pressure in the combustion chamber;

the temperature in the combustion chamber;

the burnt gas rate in the combustion chamber; and the turbulence in the combustion chamber (via $\theta_{ivc}$).

If the air loop control was perfect, the five parameters $P_{IVC}$, $T_{IVC}$, $X_{IVC}$, $M_{IVC}$ and $\theta_{ivc}$ would reach their reference values $P_{ref}$, $T_{ref}$, $X_{ref}$, $M_{ref}$ and $(\theta_{ivc})_{ref}$ instantaneously. In reality, in the transient phase, parameters $P_{IVC}$, $T_{IVC}$, $X_{IVC}$, $M_{IVC}$ and $\theta_{ivc}$ are different from their reference value. The content of the cylinder upon valve closing is therefore different from the reference content for which the ignition strategy was mapped.

The errors on these parameters upon valve closing therefore have to be taken into account to modify the ignition angle so as to keep a combustion that is as close as possible to the reference combustion (optimized combustion). Therefore, the following exists:

p the vector ($P_{IVC}$; $T_{IVC}$; $M_{IVC}$; $X_{IVC}$; $\theta_{ivc}$);

$p^{ref}$ the vector ($P_{ref}$; $T_{ref}$; $M_{ref}$; $X_{ref}$; $(\theta_{ivc})_{ref}$); and dp the vector $p-p^{ref}$=(dP; dT; dM; dX; $d\theta_{ivc}$), with:

$dP=P_{IVC}-P_{ref}$, $dT=T_{IVC}-T_{ref}$, $dM=M_{IVC}-M_{ref}$, $dX=X_{IVC}-X_{ref}$ and $d\theta=\theta_{ivc}-(\theta_{ivc})_{ref}$.

A new corrected ignition angle $(\theta_{all})_{ref}+d\theta_{all}$ is therefore sought so that angle $CA_{50}$ is at its reference value ($dCA_{50}=CA_{50}-(CA_{50})_{ref}=0$). Therefore, $d\theta_{all}$ is sought such that (see FIGS. 2 and 3 for the three situations):

if there is no error, that is, if all the parameters have reached their reference value (dp=0), the situation of the reference working pointportion is that $d\theta_{all}=0$ (situation ①), if the parameters have not reached their reference value (dp≠0), the combustion velocity is not identical to that of the reference combustion. Thus, a phase shift of the combustion and angle $CA_{50}$ has not reached its reference value (situation ②);

in order to counterbalance the errors dp≠0, an angular correction $d\theta_{all}\neq 0$ on the ignition angle is introduced to have the same phasing $CA_{50}$ (situation ③).

Figure 2:
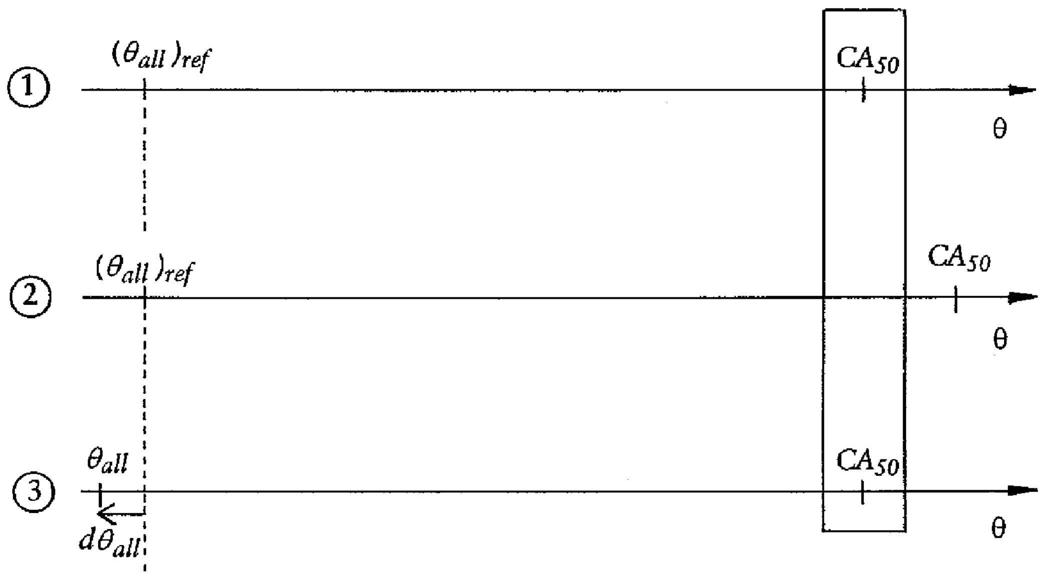
FIG. 2 illustrates a combustion chronology as a function of the crank angle according to three combustion control situations: optimum control (performed in stabilized phase), current control in transient phase without $CA_{50}$ control and desired control in transient phase with $CA_{50}$ control.
Figure 3:
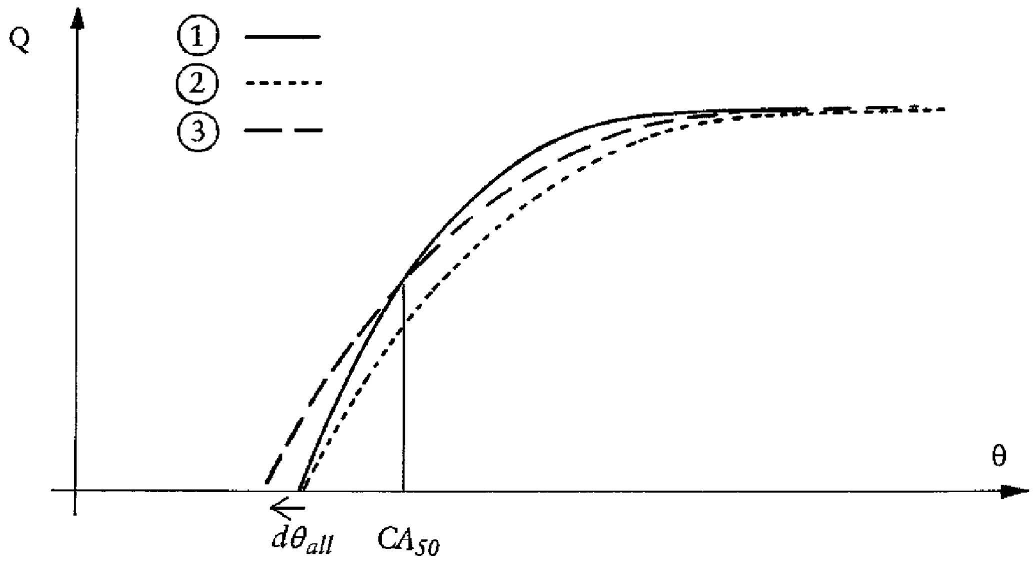
FIG. 3 illustrates the three energy release curves Q as a function of crank angle θ for the three situations described in FIG. 2.

FIG. 2 illustrates a combustion chronology according to three situations. For each situation, the horizontal axis represents crank angle θ. These axes comprise: the setpoint value $(\theta_{all})_{ref}$ of the ignition angle, the ignition angle $\theta_{all}$ and the corrective term $d\theta_{all}$. FIG. 3 illustrates the three energy release curves Q as a function of crank angle θ for the three situations described above (FIG. 2).

In order to determine correction $d\theta_{all}$, modelling of the combustion system is performed. According to a particular embodiment, it is possible to use a combustion model defined by a differential equation allowing modelling of the evolution over time of the mass of fuel consumed by the combustion. Such a combustion model can thus be written in the compact form as follows (appendix 1 illustrates an example of such a combustion model):

$$\begin{cases} \frac{dx}{d\theta} = f(x, y, p, \theta) \\ \frac{dy}{d\theta} = g(x, y, p, \theta) \\ x(\theta_{all}) = 0 \\ y(\theta_{all}) = h(p) \end{cases} \qquad (1)$$

$$\theta \in [\theta_{all}, CA_{50}]$$

with:

x: mass fraction of burnt fuel (x has dimension 1×1)

y: other variables whose dynamics are necessary for the combustion model (pressure, temperature . . . ). y has dimension 1×n with $n\in\aleph^*$.

p: parameters of the air loop to be compensated during transient phases p has dimension 1×n with $n\in\aleph^*$ $\theta_{all}$: mixture ignition angle f, g and h are entirely known functions (see Appendix 1 for example).

It can be noted that the ignition angle control method according to the invention is applicable to any combustion model in differential equation form.

Estimating the Correction of the Ignition Angle Setpoint Value $(\theta_{all})_{ref}$ Correction calculation is carried out by linearizing the combustion model to p around reference values $p^{ref}$ by introducing differences dp.

Considering the complex form of the combustion model, it is difficult to find an analytical expression for correction $d\theta_{all}$. Consequently, a first-order solution for the correction to be made is sought. The correction thus is proportional to the air loop error dp.

The correction is obtained as follows:

A sensitivity analysis of differential equation (1) with respect to the two variables p and $\theta_{all}$ is carried out. The first-order variation of the states of the differential equation (dx, dy) consecutive to any variations of p and $\theta_{all}$ around their reference values is obtained, The fact that, in the presence of error dp and of correction $d\theta_{all}$, the $CA_{50}$ should not be affected ($dCA_{50}=0$) is translated into a condition on the sensitivity of state x: $dx(\theta_{all})=0$. Thus, an equation is obtained in which dp and $d\theta_{all}$ appear. Through inversion of this equation, an expression for $d\theta_{all}$ as a function of dp and of all the variables present in the model is obtained.

The correction obtained is written as follows:

$$d\theta_{all} = ((CA_{50})_{ref} - (\theta_{all})_{ref})\cdot\Lambda\cdot dp$$

with:

$$\Lambda = \frac{\int_{(\theta_{all})_{ref}}^{(CA_{50})_{ref}} \Gamma(\theta^T)\begin{pmatrix} B^{11}(\theta) \\ B^{21}(\theta) \end{pmatrix} d\theta + \Gamma((\theta_{all})_{ref})^T \begin{pmatrix} 0 \\ \frac{dg}{dp}(p^{ref}) \end{pmatrix}}{\int_{(\theta_{all})_{ref}}^{(CA_{50})_{ref}} \Gamma(\theta)^T \begin{pmatrix} B^{12}(\theta) \\ B^{22}(\theta) \end{pmatrix} d\theta}$$

$$B^{11}(\theta) = \frac{\partial f}{\partial p}(x^{ref}, y^{ref}, p^{ref}, \theta)$$

$$B^{12}(\theta) = f(x^{ref}, y^{ref}, p^{ref}, \theta) + (\theta - (CA_{50})_{ref})\frac{\partial f}{\partial p}(x^{ref}, y^{ref}, p^{ref}, \theta)$$

$$B^{21}(\theta) = \frac{\partial g}{\partial p}(x^{ref}, y^{ref}, p^{ref}, \theta)$$

$$B^{22}(\theta) = g(x^{ref}, y^{ref}, p^{ref}, \theta) + (\theta - (CA_{50})_{ref})\frac{\partial g}{\partial \theta}(x^{ref}, y^{ref}, p^{ref}, \theta)$$

$$\Gamma(\theta) = \exp\left(\int_{\theta}^{(CA_{50})_{ref}} \begin{pmatrix} \frac{\partial f}{\partial x}(x^{ref}, y^{ref}, p^{ref}, \theta) & \frac{\partial g}{\partial x}(x^{ref}, y^{ref}, p^{ref}, \theta) \\ \frac{\partial f}{\partial y}(x^{ref}, y^{ref}, p^{ref}, \theta) & \frac{\partial g}{\partial y}(x^{ref}, y^{ref}, p^{ref}, \theta) \end{pmatrix} d\theta\right)\begin{pmatrix} 1 \\ 0 \end{pmatrix}$$

b. Ignition Loop Adaptation (Fast Loop)

The engine control system activates the fuel ignition system in the combustion chamber when the crank angle is equal to the corrected setpoint value $(\theta_{all})_{ref}+d\theta_{all}$ in order to keep combustion optimal.

One interest of the method is to directly relate the air loop errors to the correction to be applied to the ignition command via matrix Λ. The latter is entirely calculable: it only depends on the combustion model, on reference values $P_{ref}$, $T_{ref}$, $X_{ref}$ and $M_{ref}$ and on a certain number of known constants.

Figure 4:
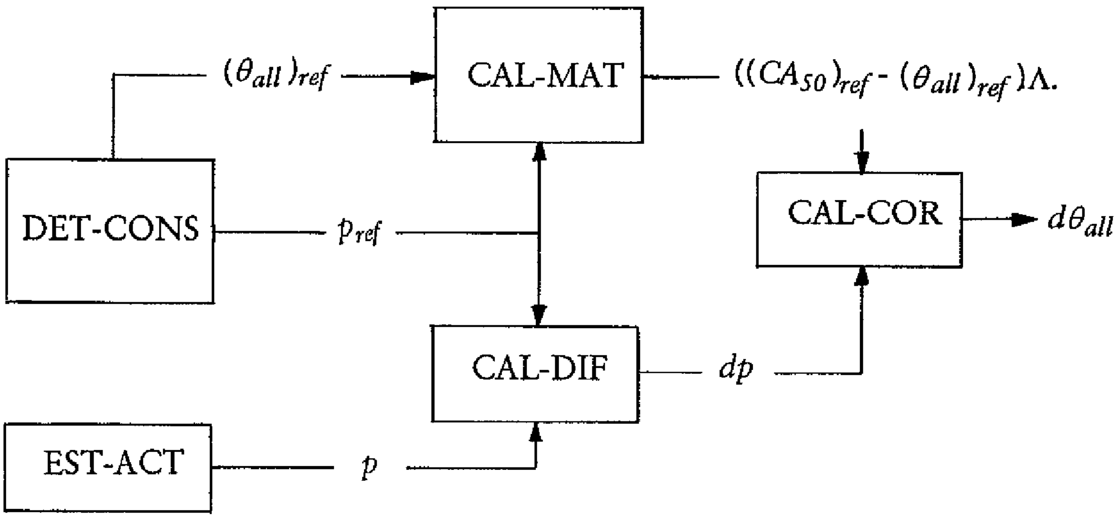
FIG. 4 illustrates a calculation scheme for correction $d\theta_{all}$ of the ignition angle.

By applying the previous correction to the ignition angle, it can be ensured (first order) that angle $CA_{50}$ is at its reference value. Little by little, the air loop leads errors dP, dT, dM and dX move towards zero, and the correction therefore disappears in the stabilized static phases. The control strategy is diagrammatically shown in FIG. 4. This figure illustrates a calculation scheme for correction $d\theta_{all}$ of the ignition angle. After estimating or measuring (EST−ACT), the real values of parameters p, determining (DET−CONS) setpoint values $p^{ref}$ of these parameters, and $(\theta_{all})_{ref}$, (CAL−MAT) is calculated which is the linearization matrix of the combustion model. Then the following coefficient is calculated: $((CA_{50})_{ref}-(\theta_{all})_{ref})\cdot\Lambda$.

The value of $(CA_{50})_{ref}$ (value of the half combustion angle of the reference combustion) is required. Thus, the differential system (1) (combustion model) with reference values $p^{ref}$ and $(\theta_{all})_{ref}$ is used as the initial conditions. The following system if obtained:

$$\begin{cases} \frac{dx^{ref}}{d\theta} = f(x^{ref}, y^{ref}, p^{ref}, \theta) \\ \frac{dy^{ref}}{d\theta} = g(x^{ref}, y^{ref}, p^{ref}, \theta) \\ x((\theta_{all})^{ref}) = 0 \\ y((\theta_{all})^{ref}) = h(p^{ref}) \end{cases}$$

$$\theta \in [(\theta_{all})^{ref}, (CA_{50})^{ref}]$$

By numerical integration of this system, the value of angle θ is determined when $x_{ref}=0.5$. This angle corresponds to the value of $(CA_{50})_{ref}$.

Finally, (CAL–COR) is calculated which is the correction $d\theta_{all}$:

$$d\theta_{all}=((CA_{50})_{ref}-(\theta_{all})_{ref})\cdot\Lambda\cdot dp$$

The method according to the invention thus allows ensured combustion control of a spark-ignition engine by controlling the three dynamic loops separately and by correcting the reference value of the ignition angle. This correction is determined in such a way that angle $CA_{50}$ is at its reference value, and the same energy release as for the reference combustion (optimized) is consequently obtained.

APPENDIX 1

Combustion Model

An example of a combustion model defined by a differential equation is presented in the following document:

F.-A. Lafossas, et al., "*Application of a New* 1*d Combustion Model to Gasoline Transient Engine Operation*," in *Proc. SAE World Congress*, no. 2005-01-2107, 2005.

This model represents the volume of the cylinder in two zones (the burnt zone and the unburnt zone) separated by the flame front (modelled as an infinitely thin layer). Throughout combustion, the flame propagates from the burnt zone to the unburnt zone. The equations of the model are as follows:

$$\begin{cases} \frac{dx}{d\theta} = \frac{1}{N_e}\left(\frac{C_1 \cdot p_2}{V(t)^{\kappa\gamma+1}} \cdot y^{\kappa+1/\gamma} + \frac{C_2 p_1^{-1/\gamma}\sqrt{k(\theta, p_3)}}{V(t)} y^{1/\gamma} \tanh\left(\frac{1}{r_0}\left(\frac{3V_{fl}}{4\pi}\right)^{1/3} - 1\right)\right) S_{geo}(V_{fl}, t) \\ V_{fl} = \max\left(f_{vol}, V(\theta)\left(1 - (1 - x)p_1^{1/\gamma} y^{-1/\gamma}\right)\right) \\ S_{geo}(V_{fl}, \theta) = \begin{cases} \sqrt[3]{36\pi} \cdot V_{fl}^{2/3} & \text{if } V_{fl} < \frac{\pi}{6}\left(\frac{V(\theta)}{A}\right)^3 \\ 2\sqrt{2\pi V_{fl}\frac{V(\theta)}{A} + \frac{4}{3}\pi^2\left(\frac{V(\theta)}{A}\right)^4} & \text{if } V_{fl} > \frac{\pi}{6}\left(\frac{V(\theta)}{A}\right)^3 \end{cases} \\ k(\theta, p_3) = C_3 p_4\left(-\int_{p_3}^{\theta} \zeta^1(z, p_3) e^{\frac{C_4}{N_e}(z-p_3)} dz + C_5\right) e^{-\frac{C_4}{N_e}(\theta-p_3)} \\ \zeta(\theta, p_3) = V(\theta)^2\left(\frac{\theta - \theta_{TDC}}{p_3 - \theta_{TDC}}\right)^2 \delta_{\theta<\theta_{TDC}} \\ \frac{dy}{d\theta} = Q_{LHV} M_f(\gamma - 1)V(\theta)^{\gamma-1}\frac{dx}{d\theta} \\ x(\theta_{all}) = 0 \\ y(\theta_{all}) = p_1 \end{cases}$$

with:

| Symb. | Quantity | Unit |
| --- | --- | --- |
| $N_e$ | Engine speed | rpm |
| θ | Crank angle | [deg] |
| $\theta_{ivc}$ | Crank angle at ivc | [deg] |
| $\theta_{TDC}$ | Crank angle of piston upper position | [deg] |
| $\theta_{all}$ | Crank angle of mixture ignition | [deg] |
| V(θ) | Cylinder volume | $m^3$ |
| $V_{ivc}$ | Cylinder volume at ivc | $m^3$ |
| P(θ) | Pressure in cylinder | Pa |
| $P_{ivc}$ | Pressure in cylinder at ivc | Pa |
| T(θ) | Temperature in mixture | K |
| $T_{ivc}$ | Temperature in mixture at ivc | K |
| $T_u(\theta)$ | Temperature of unburnt zone | K |
| $AFR_S$ | air/fuel ratio at stoichiometry | — |
| $m_{inj}$ | mass of fuel injected | kg |
| $m_{air}$ | mass of air admitted | kg |
| $m_{bg}$ | burnt gas rate in combustion chamber | kg |
| $m_f$ | mass of fuel burnt during combustion (0 to $M_f$) | kg |
| $\rho_u$ | density in the unburnt zone | $kg/m^3$ |
| $(\rho_u)_{ivc}$ | density in the unburnt zone at ivc | $kg/m^3$ |
| $Y_u$ | mass fraction of fuel in the unburnt zone | — |
| U | laminar flame velocity | m/s |
| Ξ | wrinkling due to turbulence | — |
| γ | adiabatic index | — |
| PMI | mean indicated pressure | bar |

-continued $$
\begin{cases}
\frac{dx}{d\theta} = \frac{1}{N_e}\left(\frac{C_1 \cdot p_2}{V(t)^{\kappa\gamma+1}} \cdot y^{\kappa+1/\gamma} + \frac{C_2 p_1^{-1/\gamma}\sqrt{k(\theta, p_3)}}{V(t)} y^{1/\gamma}\tanh\left(\frac{1}{r_0}\left(\frac{3V_{fl}}{4\pi}\right)^{1/3} - 1\right)\right) S_{geo}(V_{fl}, t) \\
V_{fl} = \max\left(f_{vol}, V(\theta)\left(1 - (1-x)p_1^{1/\gamma}y^{-1/\gamma}\right)\right) \\
S_{geo}(V_{fl}, \theta) = \begin{cases} \sqrt[3]{36\pi} \cdot V_{fl}^{2/3} & \text{if } V_{fl} < \frac{\pi}{6}\left(\frac{V(\theta)}{A}\right)^3 \\ 2\sqrt{2\pi V_{fl}\frac{V(\theta)}{A} + \frac{4}{3}\pi^2\left(\frac{V(\theta)}{A}\right)^4} & \text{if } V_{fl} > \frac{\pi}{6}\left(\frac{V(\theta)}{A}\right)^3 \end{cases} \\
k(\theta, p_3) = C_3 p_4\left(-\int_{p_3}^{\theta}\zeta^1(z, p_3)e^{\frac{C_4}{N_e}(z-p_3)}dz + C_5\right)e^{-\frac{C_4}{N_e}(\theta-p_3)} \\
\zeta(\theta, p_3) = V(\theta)^2\left(\frac{\theta-\theta_{TDC}}{p_3-\theta_{TDC}}\right)^2\delta_{\theta<\theta_{TDC}} \\
\frac{dy}{d\theta} = Q_{LHV}M_f(\gamma-1)V(\theta)^{\gamma-1}\frac{dx}{d\theta} \\
x(\theta_{all}) = 0 \\
y(\theta_{all}) = p_1
\end{cases}
$$

with:

| Symb. | Quantity | Unit |
|---|---|---|
| $Q_{LHV}$ | mass energy available in the fuel | J/kg |
| A | piston surface area | $m^2$ |
| $S_{fl}$ | flame surface area | $m^2$ |
| $S_{geo}$ | geometric flame surface area (without wrinkling) | $m^2$ |
| $f_{vol}$ | minimum flame volume (flame volume initiation) | $m^3$ |
| x | burnt fuel mass fraction | — |
| y | $P.V^\gamma$ (variable representing the pressure in the chamber) | Pa $m^{3\gamma}$ |

The air loop parameters to be compensated are all grouped together in the three parameters as follows:

$$p_1 = P_{ivc}V_{ivc}^{\gamma}$$

$$p_2 = \left(\frac{Tivc}{P_{ivc}^{\frac{\gamma}{\gamma-1}}}\right)^{\alpha}\frac{1 - 2.1\frac{m_{bg}}{m_{bg}+m_{air}}}{P_{ivc}^{1/\gamma}V_{ivc}}$$

$$p_3 = \theta_{ivc}$$

Finally, the parameters of the model are: $C_1$, $C_2$, $C_3$, $C_4$, α. A numerical value example (international system of units SI) for these parameters is given in the table below:

| | Parameter | | | | |
|---|---|---|---|---|---|
| | $C_1$ | $C_2$ | $C_3$ | $C_4$ | α |
| Value | 2.92 $e^{-5}$ | 2.11 | 5.34 $e^{7}$ | 1.67 $e^{-2}$ | 2.12 |

The model can thus eventually be written in the condensed form as follows:

$$
\begin{cases}
\frac{dx}{d\theta} = f(x, y, p, \theta) \\
\frac{dy}{d\theta} = g(x, y, p, \theta) \\
x(\theta_{all}) = 0 \\
y(\theta_{all}) = C^T p
\end{cases}
$$

$$\theta \in [\theta_{all}, CA_{50}]$$

with $p=(p_1, p_2, p_3)^T$, $C=(1, 0, 0)^T$ and f and g defined by the equation of the combustion model at the beginning of the appendix.

In these equations, term $CA_{50}$ can be readily substituted for any angle $CA_y$.

The invention claimed is:

1. A method of controlling combustion of a spark-ignition engine, comprising:

determining setpoint values for physical parameters linked with the combustion of a mixture of gas and of fuel in a combustion chamber and a setpoint value for an ignition crank angle for the mixture, the setpoint values being determined to optimize combustion;

using an engine control system to control actuators so that the values of the physical parameters are equal to the setpoint values by correcting the setpoint value of the ignition crank angle before the physical parameters reach the setpoint values, by calculating a correction $d\theta_{all}$ of the setpoint value of the ignition crank angle, so that a crank angle $CA_y$ at which y percent of the fuel is consumed during combustion is equal to a setpoint value of the angle for an optimized combustion by using a combustion model including a differential equation representing an evolution over time of a consumed fuel mass; and controlling with the engine control system the ignition of the mixture in the combustion chamber when the crank angle is equal to the corrected ignition crank angle setpoint value to optimize combustion.

2. A method as claimed in claim 1, wherein the correction $d\theta_{all}$ is determined by accounting for differences dp between real values p of the physical parameters and the setpoint values $p^{ref}$ of the physical parameters.

3. A method as claimed in claim 2, wherein the correction $d\theta_{all}$ is determined by linearizing the combustion model to p around setpoint values $p^{ref}$ and then calculating a first-order solution for the correction $d\theta_{all}$ to be made so that the correction $d\theta_{all}$ is proportional to the differences dp.

4. A method as claimed in claim 3, wherein the correction $d\theta_{all}$ is determined by a method comprising:

determining the real values of the physical parameters;

calculating the differences dp between the real values and the setpoint values;

determining the setpoint value of crank angle CAy by a numerical integration of the combustion model by assigning to each parameter of the model a setpoint value thereof;

calculating a linearization matrix Λ of the combustion model by linearizing the combustion model to p around setpoint values $p^{ref}$;

calculating the correction $d\theta_{all}$ by the formula:

$$d\theta_{all}=((CA_y)_{ref}-(\theta_{all})_{ref})\Lambda \cdot dp$$

where $(\theta_{all})_{ref}$ is the setpoint value of the ignition crank angle of the mixture and $(CA_y)_{ref}$ is the setpoint value of crank angle CAy.

5. A method as claimed in claim 1, wherein the crank angle CAy is the crank angle at which fifty percent of the fuel is consumed during combustion.

6. A method as claimed in claim 2, wherein the crank angle CAy is the crank angle at which fifty percent of the fuel is consumed during combustion.

7. A method as claimed in claim 3, wherein the crank angle CAy is the crank angle at which fifty percent of the fuel is consumed during combustion.

8. A method as claimed in claim 4, wherein the crank angle CAy is the crank angle at which fifty percent of the fuel is consumed during combustion.

9. A method as claimed in claim 1, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

10. A method as claimed in claim 2, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

11. A method as claimed in claim 3, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

12. A method as claimed in claim 4, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

13. A method as claimed in claim 5, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

14. A method as claimed in claim 6, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

15. A method as claimed in claim 7, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

16. A method as claimed in claim 8, wherein the physical parameters are selected from among the following parameters upon valve closing: a pressure in the combustion chamber ($P_{IVC}$), a temperature in the combustion chamber ($T_{IVC}$), a ratio ($X_{IVC}$) between a burnt gas mass and a total gas mass in the combustion chamber and an air mass ($M_{IVC}$) in the cylinder and closure angle ($\theta_{ivc}$) of an intake valve.

17. A method as claimed in claim 1, wherein a mass of fuel injected into the combustion chamber before the physical parameters reach their setpoint values is controlled by controlling combustion richness.

18. A method as claimed in claim 2, wherein a mass of fuel injected into the combustion chamber before the physical parameters reach their setpoint values is controlled by controlling combustion richness.

19. A method as claimed in claim 3, wherein a mass of fuel injected into the combustion chamber before the physical parameters reach their setpoint values is controlled by controlling combustion richness.

20. A method as claimed in claim 4, wherein a mass of fuel injected into the combustion chamber before the physical parameters reach their setpoint values is controlled by controlling combustion richness.

21. A method as claimed in claim 5, wherein a mass of fuel injected into the combustion chamber before the physical parameters reach their setpoint values is controlled by controlling combustion richness.

22. A method as claimed in claim 6, wherein a mass of fuel injected into the combustion chamber before the physical parameters reach their setpoint values is controlled by controlling combustion richness.

23. A method as claimed in claim 7, wherein a mass of fuel injected into the combustion chamber before the physical parameters reach their setpoint values is controlled by controlling combustion richness.

24. A method as claimed in claim 8, wherein a mass of fuel injected into the combustion chamber before the physical parameters reach their setpoint values is controlled by controlling combustion richness.

25. A method as claimed in claim 9, wherein a mass of fuel injected into the combustion chamber before the physical parameters reach their setpoint values is controlled by controlling combustion richness.

26. A method as claimed in claim 10, wherein a mass of fuel injected into the combustion chamber before the physical parameters reach their setpoint values is controlled by controlling combustion richness.

27. A method as claimed in claim 11, wherein a mass of fuel injected into the combustion chamber before the physical parameters reach their setpoint values is controlled by controlling combustion richness.

28. A method as claimed in claim 12, wherein a mass of fuel injected into the combustion chamber before the physical parameters reach their setpoint values is controlled by controlling combustion richness.

29. A method as claimed in claim 13, wherein a mass of fuel injected into the combustion chamber before the physical parameters reach their setpoint values is controlled by controlling combustion richness.

30. A method as claimed in claim 14, wherein a mass of fuel injected into the combustion chamber before the physical parameters reach their setpoint values is controlled by controlling combustion richness.

31. A method as claimed in claim 15, wherein a mass of fuel injected into the combustion chamber before the physical parameters reach their setpoint values is controlled by controlling combustion richness.

32. A method as claimed in claim 16, wherein a mass of fuel injected into the combustion chamber before the physical parameters reach their setpoint values is controlled by controlling combustion richness.

* * * * *